United States Patent [19]

Okura

[11] Patent Number: 4,993,795

[45] Date of Patent: Feb. 19, 1991

[54] OPTICAL TELEPHONE WIRE

[76] Inventor: Masahiko Okura, 12-7, 4-chome, Shiroganedai, Minatoku, Tokyo, Japan

[21] Appl. No.: 432,161

[22] Filed: Nov. 6, 1989

[51] Int. Cl.$^5$ .............................................. G02B 6/44
[52] U.S. Cl. ............................... 350/96.23; 174/117 R
[58] Field of Search .......................... 350/96.10, 96.23; 174/117 R, 70 A, 70 R

[56] References Cited

U.S. PATENT DOCUMENTS 4,662,712  5/1987  Tabata et al. ..................... 350/96.23
4,776,664  10/1988  Okura ................................ 350/96.23

Primary Examiner—Akim Ullah
Attorney, Agent, or Firm—Moonray Kojima

[57] ABSTRACT

An optical telephone wire comprising an optical conductor having a first covering of a circular cross-section and a messenger cable having a second covering of rectangular cross-section with one set of sides of the two sets of parallel sides of the second covering being longer than the diameter of the first convering and with the first and second coverings being integrally juxtaposed along their longitudinal axes so that spaces exist between the other set of sides of the second covering and the circular surface of the first covering.

3 Claims, 1 Drawing Sheet

OPTICAL TELEPHONE WIRE

BACKGROUND OF THE INVENTION

This invention relates to an improved optical telephone wire, such as used as drop wires in combination with known clamps.

As is known, wiring of optical wires is desired to be made as straight as possible. Thus, the well known wedge type clamps have been used for such optical wires because they permit the wiring to be clamped in a nearly straight condition.

SUMMARY OF THE INVENTION

An object of the invention is to provide an optical telephone wire wherein the covering of the optical conductor and the accompanying messenger cable have respectively a circular contour and a rectangular contour in section. The two coverings are integrally juxtaposed along the longitudinal axes thereof under a pre-established condition mentioned hereinafter, namely, that the covering of the messenger cable have a larger side dimension than the diameter of the optical conductor covering so that in a clamped state, for example, the optical conductor is relatively free of clampling pressure and straight.

DESCRIPTION OF THE PREFERRED EMBODIMENTS

Figure 4:
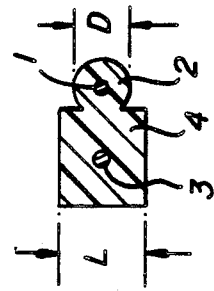
FIG. 4 is a sectional front view of another illustrative embodiment of the invention.
Figure 1:
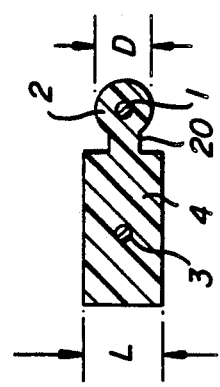
FIG. 1 is a sectional front view of an illustrative embodiment of the invention.

In FIG. 1, an optical conductor 1 of the optical telephone wire has a covering 2 of circular contour in section. A messenger cable 3 has a covering 4 of rectangular contour in section. The circular contour covering 2 is attached by an intermediate section or portion 20 to messenger covering 4, as shown in FIG. 1, or is attached directly to messenger covering 4, as shown in FIG. 4. The covering 2 is practically made of a plurality of layers of different materials, but is shown as one layer similar to the covering 4, for sake of simplicity of description. The coverings 2 and 4 are integrally juxtaposed along longitudinal axes thereof under a pre-established condition; namely, the coverings 2 and 4 are molded at the opposite surfaces thereof as shown in FIGS. 1 and 4, in such relation that the messenger covering 4 has a larger length dimension L than the diameter D of the optical conductor covering 2, and furthermore, that there are spaces between the covering 2 surface and the unconnected opposing sides of the messenger covering 4. In that manner, for example, when clamped, there will be relatively no clamping pressure on the optical conductor, all of the clampling pressure being placed on the messenger covering.

While coverings 2 and 4 should be made of known materials which are suitable to the optical wire, it will be desired in this case that the materials used for the coverings be an insulator, and have a relatively high resistance against compression and yet have a proper flexibility.

Figure 3:
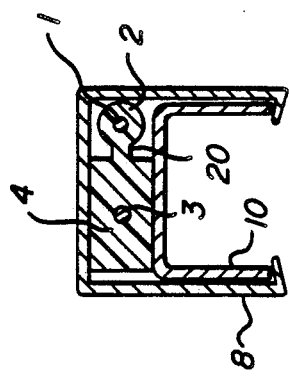
FIG. 3 is a sectional view taken along line 3-4 of FIG. 2.
Figure 2:
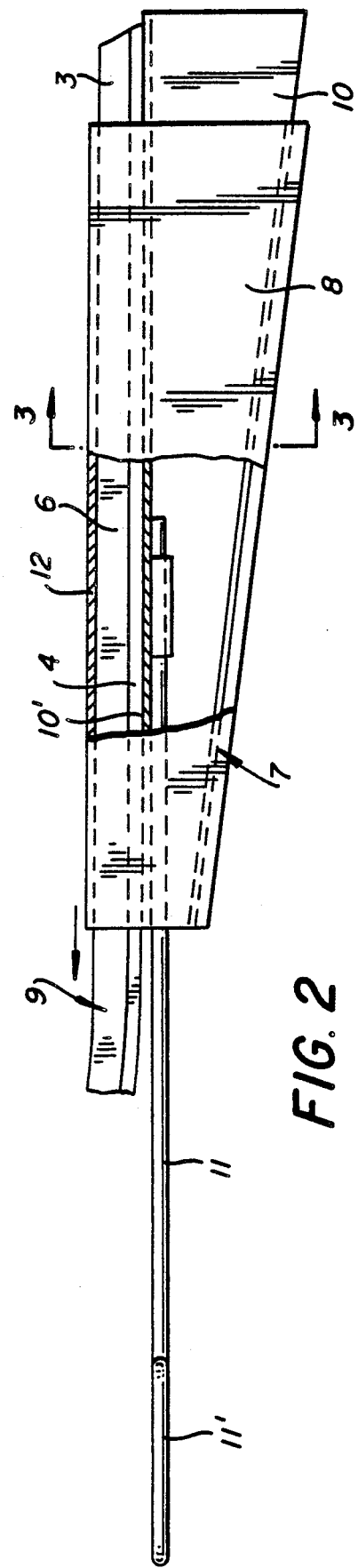
FIG. 2 is a fragmentary side elevational view of the wire of FIG. 1 with a known wedge type clamp.

To clamp the optical wire by the known wedge type clamp, it can be effected in accordance with the manner shown in FIGS. 2 and 3 wherein the optical wire 9 is applied onto the sleeve-like member 8 of the clamp 7 in the first place and then the wire 9 may be sandwiched between members 8 and 10 as shown in the figures. Thus, the wire can be clamped through the coverings 2 and 4 by moving the member 10 forward relative to the sleeve-like member 8 as shown by the arrow, i.e. in virtue of a wedge action. A suspending ring member 11 is provided with a suspending ring 11' at the fore end thereof, with the rear end thereof being attached fixedly to the upper plate 10' of member 10. Although an anti-skid portion formed by partial cut-and-raise means is ordinarily present in the upper plate 12 of member 8, it is omitted in the figures for sake of simplicity of description.

According to the invention, since the coverings of the messenger cable and the optical conductor have respectively a rectangular contour and a circular contour, in section, the contacting area of the messenger covering and clamp is large and the smaller circular conductor covering contour renders it possible to preclude clampling pressure from the optical conductor 1, which results in stable and certain clamping without exerting disadvantageous influences upon the optical conductor. Furthermore, the existence of the spaces between the clamping surfaces of the messenger covering and the circular surfaces of the optical conductor covering serves to discriminate the optical conductor line from the messenger cable.

What is claimed is:

1. An optical wire consisting of a single optical conductor (1), a single messenger cable (3), a circular covering (2) for said single optical conductor, and a rectangular covering (4) for said messenger cable; wherein said circular covering has a diameter which is smaller than the smallest sides of said rectangular covering; and wherein said circular covering and said rectangular covering are integrally juxtaposed along their longitudinal axes with one of the sides of said rectangular covering being molded integrally to said circular covering.

2. The wire of claim 1, wherein said rectangular covering is molded to said circular covering with an intermediate portion therebetween.

3. The wire of claim 1, wherein said rectangular covering is molded directly to said circular covering so that a circular surface of the circular covering is immediately adjacent a side of said rectangular covering.

* * * * *